United States Patent
Thumm et al.

(10) Patent No.: US 11,240,614 B2
(45) Date of Patent: Feb. 1, 2022

(54) METHOD OF SEALING A MODULE AND A HEARING DEVICE

(71) Applicant: Sonova AG

(72) Inventors: Natasha Thumm, Wetzikon (CH); Christian Frei, Stäfa (CH); Matthias Stadler, Männedorf (CH); André Lucien Ochsenbein, Wolfhausen (CH); Tobias Balmer, Hinterkappelen (CH); Fiona Pacifico, Baar (CH)

(73) Assignee: Sonova AG, Staefa (CH)

( * ) Notice: Subject to any disclaimer, the term of this patent is extended or adjusted under 35 U.S.C. 154(b) by 143 days.

(21) Appl. No.: 16/487,942

(22) PCT Filed: Feb. 23, 2017

(86) PCT No.: PCT/EP2017/054188
§ 371 (c)(1),
(2) Date: Aug. 22, 2019

(87) PCT Pub. No.: WO2018/153458
PCT Pub. Date: Aug. 30, 2018

(65) Prior Publication Data
US 2021/0144493 A1    May 13, 2021

(51) Int. Cl.
*H04R 25/00*    (2006.01)
*B29C 65/16*    (2006.01)
*B29C 65/48*    (2006.01)

(52) U.S. Cl.
CPC ....... *H04R 25/609* (2019.05); *B29C 65/1612* (2013.01); *B29C 65/4835* (2013.01); *H04R 25/658* (2013.01); *H04R 25/603* (2019.05); *H04R 2225/023* (2013.01); *H04R 2225/025* (2013.01)

(58) Field of Classification Search
CPC .. H04R 25/65; H04R 25/658; H04R 2460/15; H04R 2225/023; H04R 2225/77; H04R 1/1058
USPC ......................................... 381/312, 322, 324
See application file for complete search history.

(56) References Cited

U.S. PATENT DOCUMENTS

| 7,321,663 B2 | 1/2008 | Olsen |
| 8,428,282 B2 | 4/2013 | Fideler |
| 2005/0221033 A1* | 10/2005 | Procida ................... F16L 11/14 428/35.7 |

(Continued)

FOREIGN PATENT DOCUMENTS

| DE | 297 23 569 U1 | 11/1998 |
| EP | 1 314 337 A1 | 5/2003 |

(Continued)

OTHER PUBLICATIONS

European Patent Office, International Searching Authority, International Search Report for PCT/EP2017/054188, dated Aug. 30, 2018, Rijswijk, Netherlands.

*Primary Examiner* — George C Monikang
(74) *Attorney, Agent, or Firm* — ALG Intellectual Property, LLC

(57) ABSTRACT

The present invention relates to a method of sealing a module (14) in a hearing device housing. The method comprises the steps of preparing the module (14) and the hearing device housing, and applying a sealing material (28) into a space, said space being formed between the module (14) and the hearing device housing.

10 Claims, 4 Drawing Sheets

(56) References Cited

U.S. PATENT DOCUMENTS

2016/0037272 A1    2/2016  Gebert et al.

FOREIGN PATENT DOCUMENTS

| WO | 98/47319 A1 | 10/1998 |
| WO | 00/70911 A1 | 11/2000 |
| WO | 03/081950 A1 | 10/2003 |
| WO | 2016/037634 A1 | 3/2016 |

* cited by examiner

METHOD OF SEALING A MODULE AND A HEARING DEVICE

TECHNICAL FIELD

The present invention is related to a method of sealing a module and to a hearing device.

BACKGROUND OF THE INVENTION

Hearing devices are typically used to improve the hearing capability or communication capability of a user. A hearing device may pick up the surrounding sound with a microphone of the hearing device, processing the microphone signal thereby taking into account the hearing preferences of the user of the hearing device and providing the processed sound signal into a hearing canal of the user via a miniature loudspeaker, commonly referred to as a receiver. A hearing device may also receive sound from an alternative input such as an induction coil or a wireless interface.

Hearing devices commonly known in the prior art comprise a faceplate which is equipped with mechanical and electrical components. Said faceplate can be connected to the housing of the hearing device by means of mechanical parts comprising springs, pins, etc. However, the mechanical parts that need to be removed to separate the faceplate from the housing are space consuming. Further, with commonly known faceplates, an excess amount of glue can be applied from the outside between the faceplate and the hearing device housing for adhesive bonding.

It is a problem in the art that overlapping faceplate material and excessive adhesive need to be manually removed. Further, the contour needs to be polished to form a smooth interface. In the prior art, a clear lacquer can be applied to the assembled ITE to further smoothen the surface and render the bonding interface invisible. However, these steps are cumbersome and time-consuming. Further, commonly known hearing devices have limited serviceability. For repair, the strong adhesive bond must be broken along the interface. In some cases, the faceplate or housing is damaged and must be replaced for re-assembly.

Document U.S. Pat. No. 7,321,663 B2 describes mounting a socket part into a battery opening by means of resilient lugs which engage into grooves. Handles are provided to allow the socket part to be grasped. Document WO 03/081950 A1 discloses a hearing device which is provided with an interface frame, wherein said frame is needed to compensate for dimensional tolerances.

Document EP 1 838 134 B1 describes an ITE audio device and a method for fastening an electronic module in a cavity in a custom-made shell part for an in the ear audio device. The non-destructive removal of the electronic module is possible by applying a removal tool.

It is an object of the present invention to provide a method of sealing a module in a hearing device housing, which method solves the problems known in the prior art. It is further object of the present invention to provide a hearing device.

SUMMARY OF THE INVENTION

The present invention is directed to a method of sealing a module in a hearing device housing. Said method comprises the steps of preparing the module and the hearing device housing, and applying a sealing material into a space, said space being formed between the module and the hearing device housing.

Advantages of the inventive method are as follows:

The method allows to reliably seal the module to a thin titanium shell

Provided is an acoustic sealing which is not visible from the outside

The sealing provides a proper barrier against ingression of corrosive media

The sealing is of minimal size and thus uses the least possible space, which is an important factor for designing ITE/CIC devices The sealing can equalize or rather compensate for possibly dimensional tolerances resulting from the manufacturing of hearing device components, e.g. manufacturing of the hearing device housing In an example, the sealing can compensate for possibly dimensional tolerances resulting from a titanium sintering process used in the manufacturing of the hearing device housing Advantageously, the sealing bonds the module to the shell but it must not build-up much adhesive strength (the module is mechanically locked into the shell), but optionally supports the fixation After disassembly of the module from the hearing device housing for e.g. service, maintenance, etc. the sealing can be simply removed in order to allow re-assembly of the module in a later stage In an example, the method further comprises the step of curing the sealing material such to provide a seal in said space.

In an embodiment of the proposed method the preparing step comprises mounting the module to the housing. The above mentioned space is created or rather maintained between the housing and the module once the module is mounted to the housing. In an example, the space can comprise a groove or rather gap formed into the housing in a portion of the opening (e.g. the inner rim of the opening) for receiving the module.

In an embodiment of the proposed method the sealing material is a liquid adhesive, the method further comprising the step of curing said liquid adhesive such to provide a seal in the space. The liquid state of the adhesive allows the distribution of the material in the space once filled into the space. Advantageously, after solidification, any possible irregularities of the space, the housing, the module or the hearing device per se can be equalized or rather compensated by the seal.

In an embodiment of the proposed method the applying step comprises filling the liquid adhesive into the space via at least one port formed into the module, said port connecting the space to the inside of the module. The dispensing of the adhesive via the port of the module reliably prevents that any residual adhesive will remain on the inside of the module. Advantageously, no adhesive will be visible from the outside.

In an embodiment of the proposed method the liquid adhesive is filled into the space such to substantially evenly distribute into the space by means of capillary forces. The method allows the liquid adhesive to evenly distribute into the space simply by capillary forces. No further processes or operations are needed. After dispensing into the space, the liquid adhesive can flow spontaneously through the capillary forces between the module and the housing to form a fully closed and invisible fillet. To further assist the distribution of the sealing material, a low viscosity, curable sealing material can be used. Further, a sealing material with low to moderate adhesion strength can be used. The adhesion strength of the sealing material can be selected such to provide a proper support which concurrently can be removed easily (e.g. by means of breaking). This feature advantageously allows to separate the module from the housing without destroying the module and/or housing during disassembly, e.g. due to service, maintenance, etc. An exemplary sealing material comprises silicone. Since the liquid adhesive can be dispensed to the port from inside the module, no residual adhesive will remain on the surface of the housing and/or the module which could be visible from the outside. The sealing material can be filled from inside the module into the space via a dispenser.

In an embodiment of the proposed method the liquid adhesive comprises silicone.

In an embodiment of the proposed method the space is created by forming the module with spacers adapted to stably retain the module in relation to the hearing device housing.

In an embodiment of the proposed method the curing step comprises irradiating at least portions of the hearing device housing by means of IR radiation or UV radiation. Thus, the liquid adhesive can be hardened during a short time period thus creating a reliable seal in situ.

In an embodiment of the proposed method the preparing step comprises assembling a preformed inlay frame to the module or the hearing device housing, and mounting the module to the housing with the preformed inlay frame positioned into the space. In this embodiment, in the preparing step, the preformed inlay frame can be assembled to the module or the hearing device housing before the module is mounted to the housing. In an example, the preformed inlay frame is assembled around the module. The preformed inlay frame can be clipped onto the module. In another example, the preformed inlay frame is inserted into a groove formed into the housing. Once the preformed inlay frame is positioned into the space, the module can be mounted to the housing. The preformed inlay frame may be of an elastic material such as rubber.

In an embodiment of the proposed method the preformed inlay frame comprises a hotmelt material. The hotmelt material can e.g. have a low melting temperature of e.g. 60-100° C., a low melt viscosity, a low adhesion strength after solidification. The low adhesion strength allows a non-destructive removal of the module for repair. The old seal may later be reused as inlay frame or a new preformed inlay frame is provided. In an example, the hotmelt material is melted, thus temporarily providing a liquid adhesive.

In an embodiment of the proposed method the preparing step comprises: providing the sealing material as a preformed inlay frame to the module or the hearing device housing, said preformed inlay frame comprises a hotmelt material, and mounting the module to the hearing device housing with the preformed inlay frame positioned into the space, wherein the applying step comprises: melting the hotmelt material thus providing the liquid adhesive, and wherein the curing step comprises: solidifying the hotmelt material.

In an embodiment, the melting comprises applying heat, in particular by locally applying IR radiation or irradiating by a laser beam. The heat can also be provided indirectly by heating the shell. Hence, the hotmelt material can be heated completely which allows the hotmelt material to melt such to substantially fill the space evenly at the same time. Also in this case, capillary forces may act on the melted material. Potential irregularities of the space between the shell and the module are equalized. The curing of the liquefied hotmelt material is simple, it is achieved by terminating the supply of heat and letting the hotmelt material cool down below its melting temperature, in particular to a temperature (e.g. below 40° C.) which allows insertion of the hearing device into an ear canal of a user.

Moreover, the present invention is directed to a hearing device comprising a hearing device housing, a module and a seal, wherein said seal is provided according to a method of one of claims 1 to 12.

In an embodiment of the proposed hearing device the hearing device housing is made of a metal comprising titanium.

In an embodiment of the proposed hearing device the hearing device housing is formed with a groove adapted to provide the space between the hearing device housing and the module to be applied with the sealing material.

In an embodiment of the proposed hearing device the module comprises spacers which are adapted to retain the module in relation to the hearing device housing. The spacers offer the advantage, that the preformed inlay frame can be mounted with greater precision.

In an embodiment of the proposed hearing device the seal comprises an elastic material, in particular rubber. The elastic material can comprise an O-Ring made of rubber. One of the advantages in using the elastic material as the seal is that potential tolerances between the housing and the module can be compensated. Further, possible steps of filling adhesive into the space and curing the adhesive can be omitted. Furthermore, possible steps of melting a sealing material made of a hotmelt material by e.g. heating can be omitted. In an example, the elastic material, e.g. the O-Ring, is disposed around the module before mounting the module to the housing. In another example, the elastic material is inserted into a recess formed into the housing before mounting the module to the housing.

It is expressly pointed out that any combination of the above-mentioned embodiments is subject of further possible embodiments. Only those embodiments are excluded that would result in a contradiction.

BRIEF DESCRIPTION OF THE DRAWINGS

The present invention is further described with reference to the accompanying drawings jointly illustrating various exemplary embodiments which are to be considered in connection with the following detailed description. What is shown in the figures is.

DETAILED DESCRIPTION OF THE INVENTION

Figure 1:
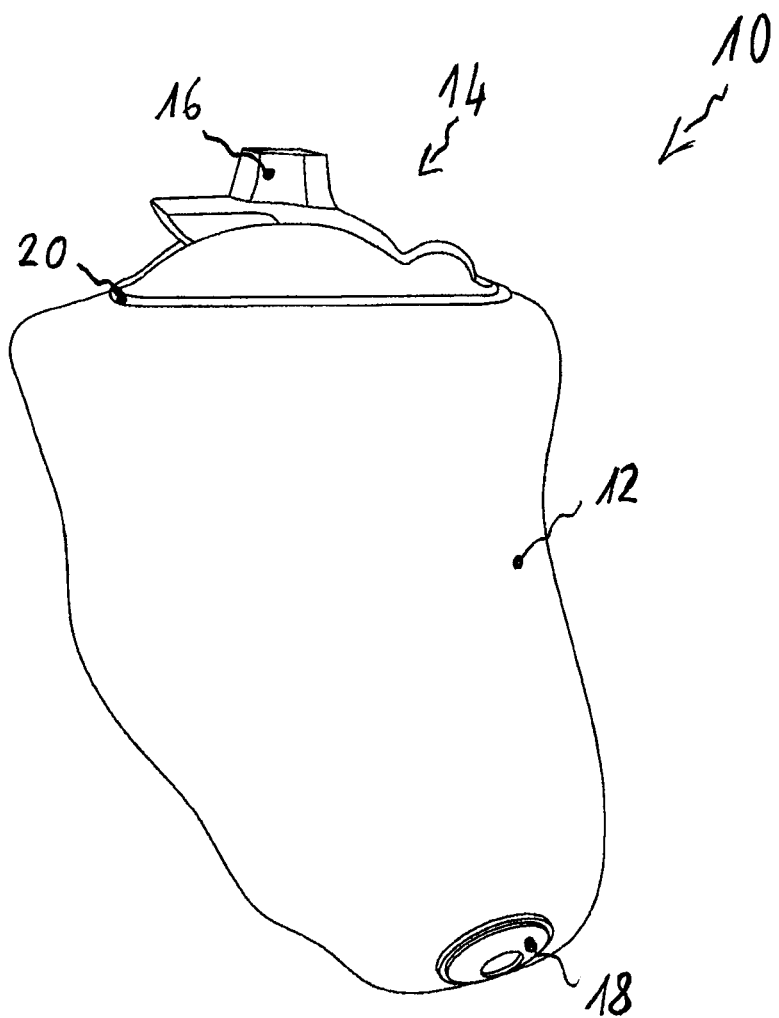
FIG. 1 is a perspective view of a hearing device comprising a module received into a housing, FIG. 2 schematically depicts a method of assembling a module to a hearing device housing in a first aspect of the present invention, FIG. 3 schematically depicts a method of assembling a module to a hearing device housing in a second aspect of the present invention.

FIG. 1 depicts a hearing device 10 in a perspective view. The hearing device 10 is an In-The-Ear (ITE) hearing device. Of course, other hearing device types can be used, as well. In the shown example, the housing 12 of the hearing device 10 is made of titanium. One of a plurality of advantages in using titanium is the ability of creating housings which are very thin while still showing increased strength. The hearing device 10 further comprises a module 14 which is inserted into an opening formed into the hearing device housing 12. Details about sealing the module 14 to the hearing device housing 12 will be given in the following. The module 14 can be a pre-assembled component comprising a battery compartment which openable end thereof is for receiving a battery (not shown). The openable end can be opened and closed via a battery door 16. The FIG. 1 shows the battery door 16 being closed. The battery door 16 can be opened to exchange a used battery as well as for service, maintenance, etc. Next to the battery, the module 14 can further comprise at least one microphone, a GMR switch, processing means, etc. The module 14 can be easily pre-assembled to the hearing device housing 12. The hearing device 10 further comprises a sound outlet 18 for outputting sound from a receiver (not shown) of the hearing device 10 to the ear canal of the user. The module 14 comprises an outer rim 20 which abuts against the periphery of an opening of the hearing device housing 12 once inserted.

Figure 2:
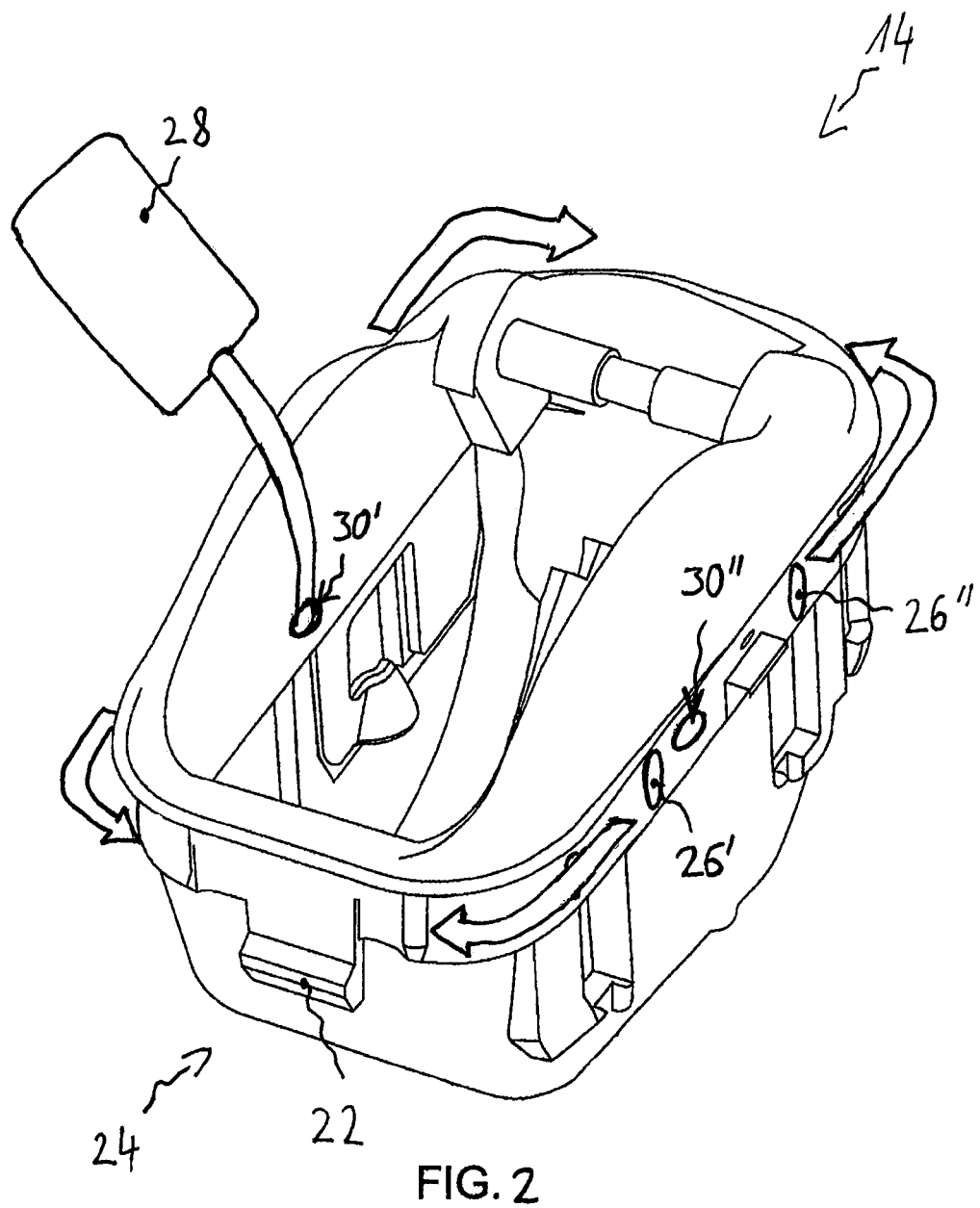

FIG. 2 schematically depicts a method of assembling a module 14 to a hearing device housing (refer to FIG. 1) in a first aspect of the present invention. Compared to the illustration in FIG. 1, the module 14 in FIG. 2 is shown with the battery door temporarily removed. The method of sealing comprises a step of removably mounting the module 14 to the housing. In doing so, the module 14 can comprise an elastic latching portion 22 which forms part of a click-in mechanism 24. This click-in mechanism 24 is adapted to removably connect the module 14 to the housing. While connected, the latching portion 22 is engaged with a portion of the housing (e.g. a recess formed into the housing). In an example, the distal end of the latching portion 22 can be received (snapped) into a recess formed into the housing. This engagement can be released once a pull-out force applied between the module 14 and the housing in relation to each other exceeds a predetermined separation-threshold.

In an example, spacers 26',26", notches, mechanical catchers, etc. can be used to lock or rather retain the module 14 in place, which can provide an immovable fit of the module 14 in relation to the housing in all three spatial dimensions. With the module 14 mounted to the housing, a space is created between both thereof. In an example, the space is created by the provision of a gap between the module 14 and portions of the inner rim of the opening of the housing, wherein this gap is maintained by means of e.g. the spacers 26',26".

The sealing method further comprises the step of applying a sealing material, as schematically indicated by the reference sign 28, into the space. In an example, the sealing material 28 is a low viscosity, curable sealing material with low to moderate adhesion strength to interfacial materials. The sealing material 28 can comprise a soft material such as silicone. In another example, the sealing material 28 can comprise a liquid adhesive.

The sealing material 28 is filled into the space via ports 30',30" formed into the module 14, wherein said ports 30',30" are formed through the module 14 such to connect the space between the module 14 and the housing to the inside of the module. In order to allow access to the ports, no battery is inserted into the battery compartment and advantageously the battery door is removed. According to the aspect of the invention, the sealing material 28 is dispensed to the ports 30',30" from the inside of the module 14. This feature omits the necessity to apply adhesive from the outside which might adhere to the outside of the housing and might thus be visible. Hence, additionally steps for removing the adhesive from the outside can be omitted. While two ports 30',30" are shown, more or less ports can be provided.

The sealing material 28 is filled into the space such to evenly distribute into the space by means of capillary forces, as schematically indicated by arrows in the figure. By using the capillary forces between the module 14 and the housing, the sealing material 28 can form a closed and invisible fillet without the necessity of further operations. Hence, time and costs can be reduced. Further, the space is filled very reliably. This provides that any possible irregularities of the space, the housing, etc. can be equalized or rather compensated by the seal.

Subsequently to the step of filling the space with the sealing material 28, the filled sealing material 28 is cured. Once cured, the sealing material 28 provides a proper in-situ seal in said space which seal reliably fixes the module 14 to the housing. The curing step can comprise e.g. irradiating the hearing device by means of IR radiation or UV radiation.

As mentioned above, the seal fixes the module 14 to the housing releasably. Therefore, advantageously, the module 14 can be separated from the housing, e.g. due to maintenance, service, etc., without destroying the module 14 and/or housing during disassembly. Once removed, the seal can be replaced by the same sealing method, easily. Further, advantageously, the seal only requires reduced space, which is an important factor for designing ITE and CIC hearing devices. Such low space consumption would not be possible by using a self-standing sealing part during assembly (e.g. an O-ring type sealing).

Figure 3:
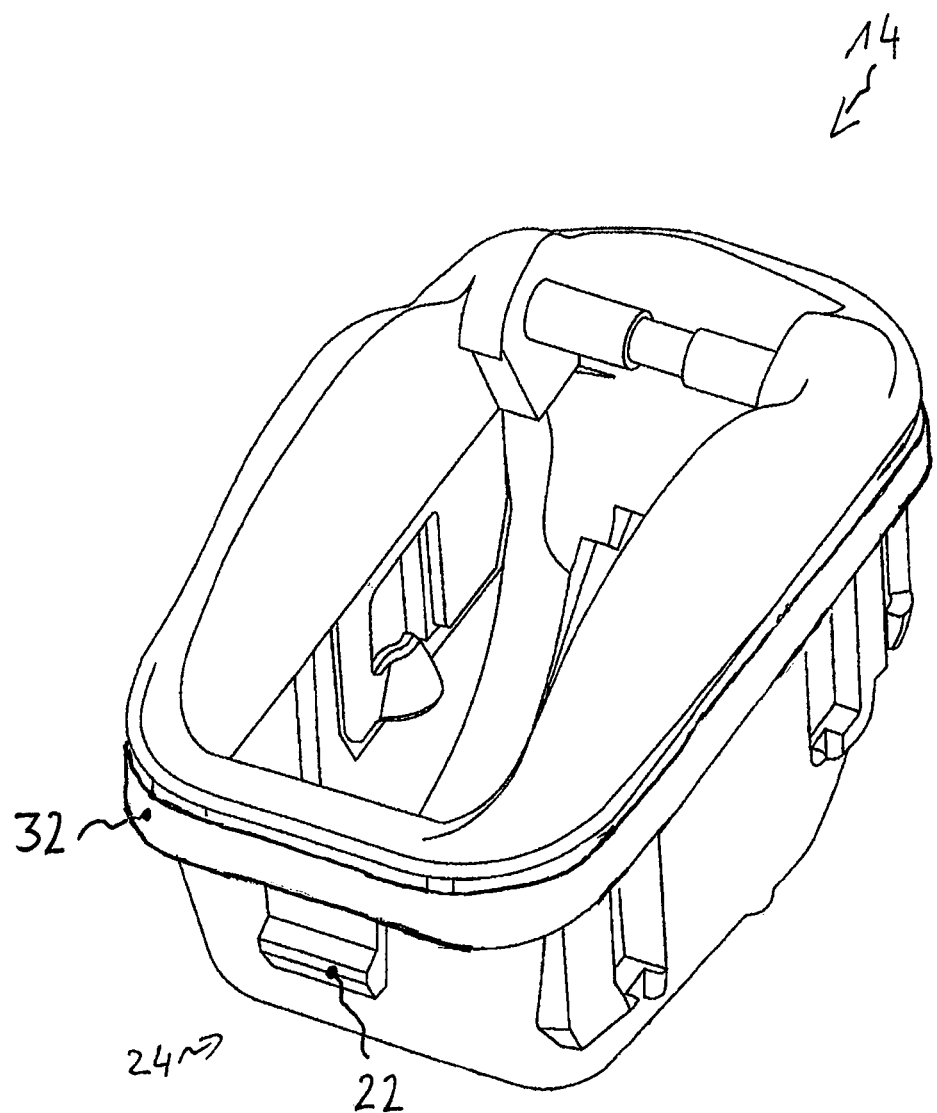

FIG. 3 schematically depicts a method of assembling the module 14 to the hearing device housing (refer to FIG. 1) in a second aspect of the present invention. In the shown aspect, the module 14 is assembled with a preformed inlay frame 32. The inlay frame 32 is dimensioned such to substantially correspond to at least a portion of the module 14. Once assembled, the preformed inlay frame 32 substantially surrounds the module 14. While not shown, the preformed inlay frame 32 can be assembled to the hearing device housing. In this example, the preformed inlay frame 32 can be inserted into a groove which is correspondingly formed into the hearing device housing. The preformed inlay frame 32 comprises a hotmelt material which melts once heated beyond a predetermined temperature.

In a further step, the module 14 is removably mounted to the hearing device housing. In an example, the module 14 is removably fixed to the housing by means of the click-in mechanism 24 comprising the latching portion 22 which can snap into a recess formed into the housing. In a further step, the hotmelt material of the preformed inlay frame 32 is melted. The hotmelt material can be melted by means of e.g. applying localized heat such to melt the preformed inlay frame 32 while in place or rather while being positioned into the space between the hearing device housing and the module 14. In a further example, the hotmelt material can be melted by applying IR radiation, irradiating by a laser beam, etc. The melted material spreads in the space and therefore reliably fills the space. Once melted and spread in the space, the process for melting the hotmelt material (e.g. applying heat) is terminated. The curing of the hotmelt material is achieved by attending until the material cools down below its melting point. This results in the hotmelt material solidifies in the space therefore providing the seal in the space. Advantageously, this aspect allows a strongly reduced curing time for forming the seal. Like in the aspect as shown in FIG. 2, serviceability of the inventive hearing device is improved. In case of repair, maintenance, service, etc., the seal can be broken easily along the interface without damaging the module 14 and/or the hearing device housing. Afterwards, for reassembling, the module 14 can be sealed again according to one or more aspects of the invention. Therefore, costs and resources can be saved.

Figure 4:
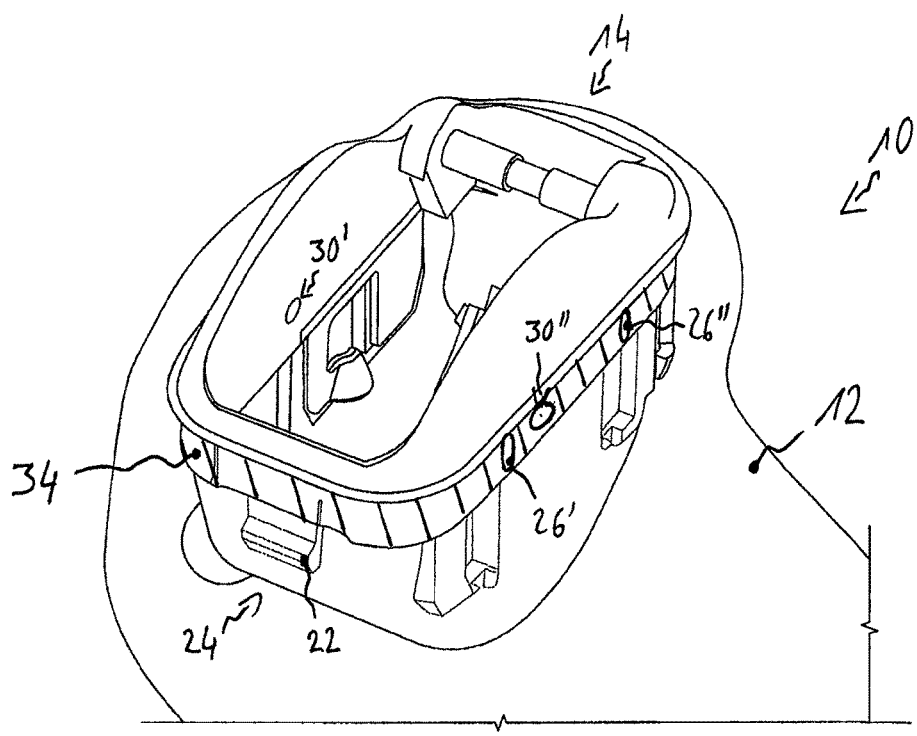
FIG. 4 shows the hearing device in a semi-transparent view.

FIG. 4 shows the hearing device 10 in a semi-transparent view. In the shown hearing device 10, the module 14 is sealed to the hearing device housing 12 by means of a seal (schematically indicated by hatched lines). The seal 34 is provided by a method according to one of aspects of the present invention. In an example, the seal 34 is provided by filling sealing material into the space between the module 14 and the hearing device housing 12 via ports 30',30". The space can be created by forming the module 14 with spacers 26',26" adapted to retain the module 14 in a fixed relation to the hearing device housing 12. The sealing material is filled into the space such to substantially evenly distribute into the space by means of capillary forces. The module 14 can be removably connected to the housing 12 by means of a click-in mechanism 24 which comprises an elastic latching portion 22 which is engaged to a portion of the housing 12. In an example, the distal end of the latching portion 22 can be received (snapped) into a recess (not shown) formed into the housing 12.

The invention claimed is:

1. A method of sealing a hearing device, the method comprising:
   mounting a module to a hearing device housing,
      wherein the module includes a port that is formed through a wall of the module, the port connecting to a space between the module and the hearing device housing,
      wherein the module includes electronic circuitry for the hearing device;
   adding sealing material to the port in the wall of the module such that sealing material fills the space between the module and the hearing device housing,
      wherein the sealing material is a liquid adhesive; and
   curing the sealing material to seal the hearing device.

2. The method of claim 1, wherein the liquid adhesive comprises silicone.

3. The method of claim 1, wherein the curing comprises infrared radiation (IR) or Ultraviolet (UV) radiation.

4. The method of claim 2, the method further comprising:
   attaching a preformed inlay frame to the module or the hearing device housing,
      wherein the preformed inlay frame comprises a hotmelt material.

5. The method of claim 4, the method further comprises:
   melting the hotmelt material.

6. The method of claim 5, wherein the melting comprises applying heat with IR radiation or a laser beam.

7. The method of claim 1, wherein the port is first port, and wherein the module includes a second port, and the method further comprises:
   adding sealing material to the second port.

8. The method of claim 1, wherein the module includes spacers in the space between the module and the hearing device housing.

9. A hearing device, the hearing device comprising:
   a housing comprising titanium;
   a module mounted to the housing,
      wherein the module includes a port formed in a wall of the module, the port configured to enable flow of sealing material from an inside of the module to a space between the housing and module,
      wherein the module includes spacers configured to hold the module in place relative to the housing,
      wherein the module includes hearing device circuitry; and
   a sealing material in the space between the housing and the module,
      wherein the sealing material comprises an elastic material and wherein the sealing material was cured.

10. The hearing device of claim 9, the hearing device further comprising:
    a clip-in mechanism configured to attach the housing to the module.

* * * * *